Figures 1, 2:
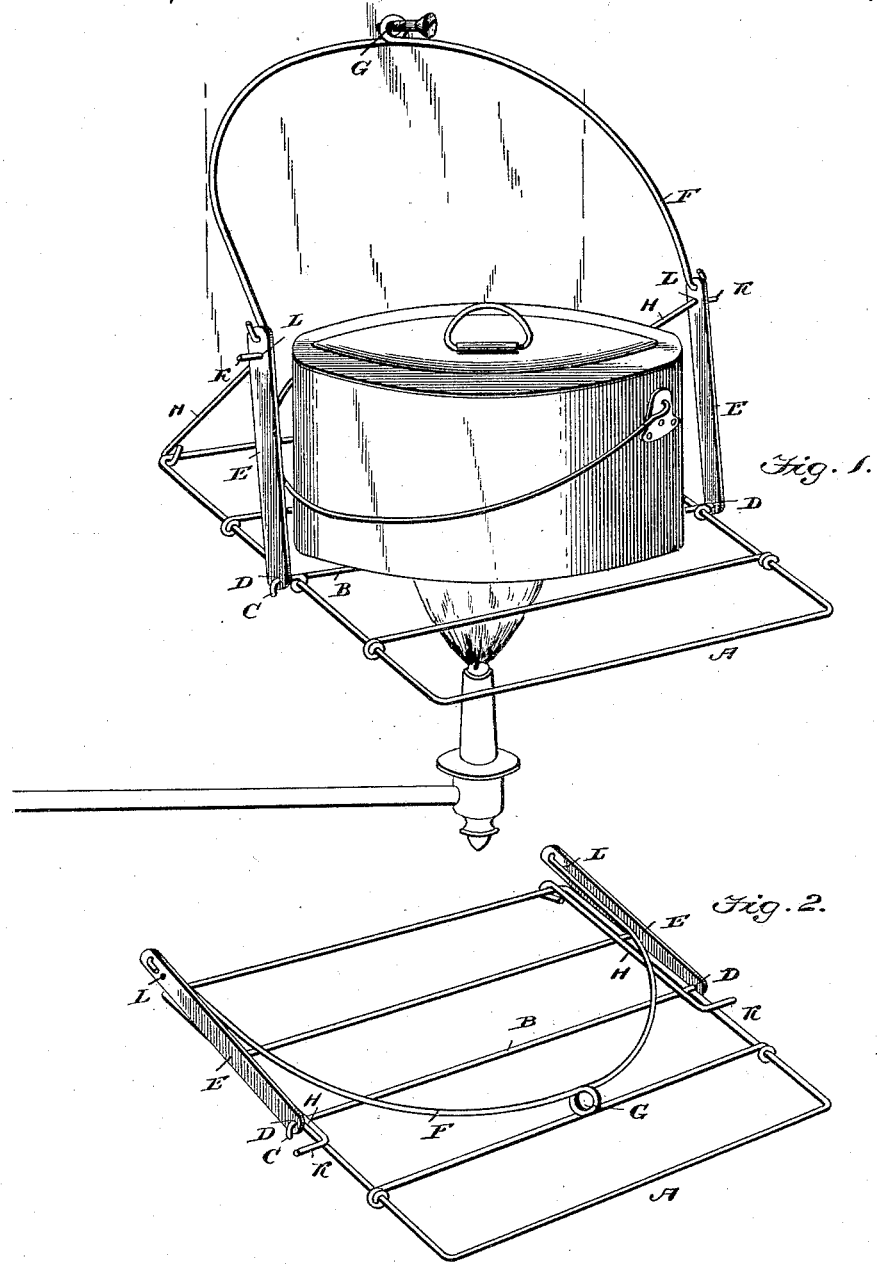

(No Model.)

A. J. McDONALD.
HOUSEHOLD ARTICLE.

No. 461,842. Patented Oct. 27, 1891.

Angus J. McDonald,
Inventor.

Witnesses:

By
Attorney.

UNITED STATES PATENT OFFICE.

ANGUS J. McDONALD, OF BLAINE, WASHINGTON.

HOUSEHOLD ARTICLE.

SPECIFICATION forming part of Letters Patent No. 461,842, dated October 27, 1891.

Application filed January 15, 1891. Serial No. 377,871. (No model.)

*To all whom it may concern:*

Be it known that I, ANGUS J. MCDONALD, a citizen of Canada, residing at Blaine, in the county of Whatcom and State of Washington, have invented a certain new, useful, and valuable Improvement in Household Articles, of which the following is a full, clear, and exact description.

My invention relates to an improved household article, and is a device of this class in the form of a bracket or shelf adapted to be supported above a gas-jet, lamp, or flame to sustain a vessel containing a liquid or food to be heated.

The device is especially adapted to be used in a sick-room where it is found desirable to heat water, tea, milk, or other beverage, or food for the patient at a moment's notice. It is also adapted for use for any other purpose where it could be effectively used, as also for heating water for shaving and making any character of hot drinks.

The object of the invention is the production of a device of the character and for the purpose named which can be manufactured at a very small price in order to place it within reach of all, which can be easily and quickly adjusted for use, and which will serve the purpose in a perfect manner.

To attain the desired objects, the invention consists in certain details of construction, substantially as hereinafter described, illustrated, and specifically claimed.

Figure 1 represents a perspective view of the device in position for use, and Fig. 2 represents a perspective view of the device as it appears when folded and not in use.

The device consists of a frame A, preferably constructed of wire or metal, and in this instance is formed of a rectangular frame and parallel bars, the middle bar B having its ends bent around the outer frame and formed with hooks C, which enter openings D in the lower ends of the bars E. The upper ends of the bars E are formed with openings in which engage the lower ends of the bail or yoke F for suspending the bracket from the wall or the like, the yoke or bail having an eye G for suspending the same from a nail, screw, or other place. To sustain the bars or plates E in proper position, I employ the links H, pivoted at their lower ends to the rear of the frame and having their forward ends provided with hooks K, to engage the openings L in said bars or plates E.

From this construction it will be seen that I provide a simple, cheap, and efficient device for suspending a vessel above a flame for heating liquids or food, the advantages of which will be readily apparent and need no further comment herein.

I claim as my invention—

A device of the character described, consisting of a frame, bars or plates connected to the frame, a bail or yoke connected to the bars for suspending the frame, and links connected to the frame and engaging the said bars or plates to retain them in proper position.

In testimony whereof I affix my signature in presence of two witnesses.

ANGUS J. McDONALD.

Witnesses:
W. J. GILLESPIE,
THEO. G. STAEUBLE.